United States Patent
Sonoda et al.

(10) Patent No.: US 8,743,333 B2
(45) Date of Patent: Jun. 3, 2014

(54) LIQUID CRYSTAL DISPLAY DEVICE AND MANUFACTURING METHOD FOR SAME

(75) Inventors: Daisuke Sonoda, Chiba (JP); Toshiki Kaneko, Chiba (JP); Hideo Tanabe, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 326 days.

(21) Appl. No.: 13/009,895

(22) Filed: Jan. 20, 2011

(65) Prior Publication Data

US 2011/0176081 A1 Jul. 21, 2011

(30) Foreign Application Priority Data

Jan. 21, 2010 (JP) .................................. 2010-011064

(51) Int. Cl.
*G02F 1/1343* (2006.01)
*G02F 1/136* (2006.01)

(52) U.S. Cl.
USPC .................. 349/147; 349/42; 349/43; 349/46

(58) Field of Classification Search
USPC .................................................... 349/147, 46
See application file for complete search history.

(56) References Cited

U.S. PATENT DOCUMENTS

| | | | |
|---|---|---|---|
| 6,081,308 A * | 6/2000 | Jeong et al. ..................... | 349/42 |
| 7,714,975 B1 | 5/2010 | Yamazaki et al. | |
| 7,777,230 B2 | 8/2010 | Miyake et al. | |
| 2003/0124851 A1* | 7/2003 | Jo et al. ........................... | 438/689 |
| 2006/0105579 A1* | 5/2006 | Chae et al. ...................... | 438/754 |
| 2007/0236641 A1* | 10/2007 | Ning et al. ...................... | 349/147 |
| 2008/0308811 A1 | 12/2008 | Miyake et al. | |
| 2010/0001275 A1* | 1/2010 | Kim et al. ........................ | 257/57 |
| 2010/0117086 A1* | 5/2010 | Akimoto et al. ................ | 257/57 |

FOREIGN PATENT DOCUMENTS

| | | |
|---|---|---|
| JP | 2001-264807 | 9/2001 |
| JP | 2002072230 | 3/2002 |
| JP | 2008311545 | 12/2008 |

OTHER PUBLICATIONS

Japanese Official Action dated Mar. 4, 2014, for JP Application No. 2010-011064.

* cited by examiner

*Primary Examiner* — Bumsuk Won
*Assistant Examiner* — Charles Chang
(74) *Attorney, Agent, or Firm* — Antonelli, Terry, Stout & Kraus, LLP.

(57) ABSTRACT

The present invention provides a liquid crystal display device having gate wires and source/drain wires with a multilayer structure made of the same material which can be manufactured at low cost, as well as a manufacturing method for the same. In accordance with the manufacturing method, a wet etching process is carried out on the gate wires and the source/drain wires using an etchant including hydrofluoric acid and an oxidant, and the concentration of hydrofluoric acid in the etchant is different between the etchant for the gate wires and that for the source/drain wires.

7 Claims, 5 Drawing Sheets

LIQUID CRYSTAL DISPLAY DEVICE AND MANUFACTURING METHOD FOR SAME

CROSS-REFERENCE TO RELATED APPLICATIONS

The present application claims priority over Japanese Application JP2010-011064 filed on Jan. 21, 2010, the contents of which are hereby incorporated into this application by reference.

BACKGROUND OF THE INVENTION (1) Field of the Invention

The present invention relates to a liquid crystal display device and a manufacturing method for the same, and in particular to a liquid crystal display device having gate wires and source/drain wires with a multilayer structure made of the same materials, as well as a manufacturing method for the same.

(2) Description of the Related Art

Liquid crystal display devices use thin film transistors TFT for driving display pixels. In addition, gate wires and source/drain wires are formed in a matrix in order to supply power to the thin film transistors. JP2008-311545A, for example, discloses gate wires formed of Mo or an alloy thereof, and source/drain wires formed of Al or an alloy thereof, and a layer of Ti or Mo that is provided on the top surface of Al or an alloy thereof.

In the case where gate wires and source/drain wires are formed of different materials, the difference in material causes the wires to have different electrical resistances. In order to solve this problem, it is necessary to adjust the thickness (film thickness) and width of the wires, but adjustment of the film thickness during the process makes the manufacturing steps extremely complex, and there is a limitation to how much the wires can be adjusted in width, due to the resolution of the mask.

Meanwhile, JP2002-72230A proposes a method for forming gate wires and source/drain wires with a multilayer structure of the same material. JP2002-72230A discloses wires made of multilayer films titanium, aluminum alloy and titanium nitride that have undergone a plasma etching process using a mixed gas of chlorine and argon.

In the case where gate wires and source/drain wires with a multilayer structure are formed of the same material, it is possible for the gate wires and the source/drain wires to have the same electrical resistance, and therefore there is an advantage, such that the patterning of wires having connections between the gate and source/drain wires is easy. It is necessary for the gate insulating film provided in a layer above the gate wires to have a high withstanding voltage, and therefore the coverage needs to be appropriate with the angle of the taper of the gate wires small. Meanwhile, it is necessary for the angle of the taper of the source/drain wires to be wide in order to increase the density of the wires, so that the frame of the liquid crystal display device can be made narrower.

Concerning the adjustment of the angle of the taper of wires, JP2002-72230A discloses the angle of the taper of wires, which is adjusted by adjusting the partial pressure of the argon gas. However, processing methods using dry etching, such as the plasma etching in JP2002-72230A, are more costly than those using wet etching, and have poor throughput, which makes continuous processing difficult and causes the cost of manufacture to increase.

SUMMARY OF THE INVENTION

An object of the present invention is to solve the above described problems, and to provide a liquid crystal display device having gate wires and source/drain wires with a multilayer structure made of the same material, which can be manufactured at low cost, as well as a manufacturing method for the same.

In order to solve the above described problems, the display device according to the present invention has the following characteristics.

(1) The manufacturing method for a liquid crystal display device having gate wires and source/drain wires with a multilayer structure made of the same material, characterized in that a wet etching process is carried out on the gate wires and the source/drain wires using an etchant including hydrofluoric acid and an oxidant where the concentration of hydrofluoric acid in the etchant is different for the etchant for the gate wires and the etchant for the source/drain wires.

(2) The manufacturing method for a liquid crystal display device according to (1), characterized in that titanium, aluminum or an alloy thereof and titanium are layered in sequence in the multilayer structure.

(3) The manufacturing method for a liquid crystal display device according to (1) or (2), characterized in that the concentration of hydrofluoric acid is lower in the etchant for processing the source/drain wires than in the etchant for processing the gate wires.

(4) The manufacturing method for a liquid crystal display device according to (3), characterized in that the concentration of hydrofluoric acid for the etchant for processing the gate wires is in a range from 0.7% to 1.3% and the concentration of hydrofluoric acid for the etchant for processing the source/drain wires is in a range from 0.1% to 0.5%.

(5) The manufacturing method for a liquid crystal display device according to any of (1) to (4), characterized in that an angle of a taper of the gate wires is smaller than an angle of a taper of the source/drain wires.

(6) The liquid crystal display device having gate wires and source/drain wires with a multilayer structure made of the same material, characterized in that an angle of a taper of the gate wires is smaller than an angle of a taper of the source/drain wires.

According to the present invention, a wet etching process is carried out, and therefore the cost of the process is low, and in addition continuous processing is possible, and thus the cost of manufacture of the liquid crystal display device is lower. Furthermore, the angle of the taper of wires can be easily adjusted by adjusting the concentration of hydrofluoric acid in the etchant. In order to do so it is not necessary for the process to be complex.

In addition, according to the present invention gate wires and source/drain wires have a multilayer structure made of the same material, and therefore the patterning of the wires with connections between the gate and source/drain wires is easy, and the angle of the taper of the wires can easily be adjusted, as described above, and therefore a sufficient withstanding voltage can be secured for the gate insulating films, and the density of the source/drain wires can be increased, thus making it possible to make the frame of the liquid crystal display device narrower.

DESCRIPTION OF THE EMBODIMENTS

Figure 1:
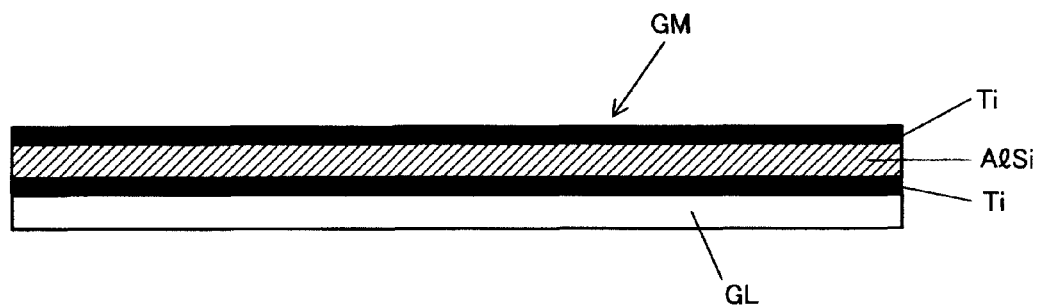
FIG. 1 is a diagram showing part of the manufacturing process for a liquid crystal display device according to the present invention (step of sputtering and vapor depositing a metal or gate wires)

The liquid crystal display device according to the present invention is described in detail below.

FIGS. 1 to 9 are diagrams illustrating the manufacturing method for a liquid crystal display device according to the present invention. Here, in order to simplify the descriptions, components having the same symbols in the figures are formed of the same member.

The manufacturing method for a liquid crystal display device according to the present invention is a manufacturing method for a liquid crystal display device having gate wires and source/drain wires with a multilayer structure made of the same material, characterized in that a wet etching process is carried out on the gate wires and the source/drain wires using an etchant including hydrofluoric acid and an oxidant where the concentration of hydrofluoric acid in the etchant is different for the etchant for the gate wires and the etchant for the source/drain wires.

It is possible to easily adjust the angle of the taper of the wires by adjusting the concentration of the hydrofluoric acid included in the etchant. In some cases a sufficient withstanding can be secured for the voltage of the gate insulating film when the angle of the taper of the gate wires is set to 45° C. or less, if possible to approximately 20° C. to 30° C. In addition, when the angle of taper of the source/drain wires is set to 45° C. or more, if possible to approximately 60° C. to 70° C., the density of the source/drain wires is sufficiently high to gain a liquid crystal display device with a narrow frame.

Furthermore the multilayer structure where the gate wires and the source/drain wires are made of the same material makes it easy to adjust the electrical resistance to the same value, and thus the patterning of the wires having connections between the gate and source/drain wires is easy, and thus the freedom of wiring is great.

In the multilayer structure of the wires in the liquid crystal display device according to the present invention, titanium, aluminum or an alloy thereof and titanium are layered in sequence. An appropriate aluminum alloy is AlSi or AlCu.

The etchant used in the manufacturing method for a liquid crystal display device according to the present invention includes hydrofluoric acid and an oxidant. As the oxidant, a water solution of hydrogen peroxide, nitric acid and sulfuric acid can be used. The present invention is characterized in that the properties of etching of wires of which the speed is different depending on the concentration of hydrofluoric acid contained in the etchant when the wires are formed of three layers of two different materials, such as titanium-aluminum (aluminum alloy)-titanium, are used. When the concentration of hydrofluoric acid is high, the speed of etching of titanium is much faster than the speed of etching of aluminum, and thus the angle of the taper of the wires is small. Meanwhile, when the concentration of hydrofluoric acid is low, the speed of etching of titanium is quite close to that of aluminum, and therefore the angle of the taper of the wires is large.

In order to adjust the angle of the taper of wires having a multilayer structure of titanium, aluminum or an alloy thereof and titanium, it is preferable for the concentration of hydrofluoric acid in the etchant for processing the gate wires to be 0.6% or higher, and it is more preferable for it to be in a range from 0.7% to 1.3%, and it is preferable for the concentration of hydrofluoric acid in the etchant for processing the source/drain wires to be 0.6% or less, and it is more preferable for it to be in a range from 0.1% to 0.5%.

In the case where the concentration of hydrofluoric acid is 1.3% or higher, not only titanium on the upper side (on the side of the surface exposed to the etchant) of the aluminum (or aluminum alloy) layer, but also titanium in the layer on the lower side (substrate (glass) side) is etched, so that a hollow is created beneath the aluminum layer, and thus so-called undercut wires are formed. In the case where the concentration of hydrofluoric acid is 0.1% or less, "eaves" of the titanium layer are formed above the aluminum layer so as to protrude from the aluminum layer, making the wire structure inappropriate.

In addition it is preferable for the concentration of the oxidant in the etchant to be approximately 30%, and the etchant usually contains water as well as hydrofluoric acid and oxidant. Various additives can, of course, be added to the etchant if necessary, as long as the manufacturing method according to the present invention can be used. As described above, gate wires and source/drain wires are patterned in a wet etching process according to the present invention, and therefore it is possible to greatly lower the cost in comparison with dry etching, as in JP2002-72230A.

In the following an example of the manufacturing method for a liquid crystal display device according to the present invention is described in reference to FIGS. 1 to 9.

First, as shown in FIG. 1, a metal layer for gate wires GM is formed on a transparent substrate GL, such as of glass, for forming a liquid crystal display panel in the sputtering and vapor depositing step. A multilayer structure where titanium (Ti), an aluminum alloy (AlSi) and titanium (Ti) are layered in sequence is provided on the transparent substrate as a metal layer for gate wires.

Figure 2:
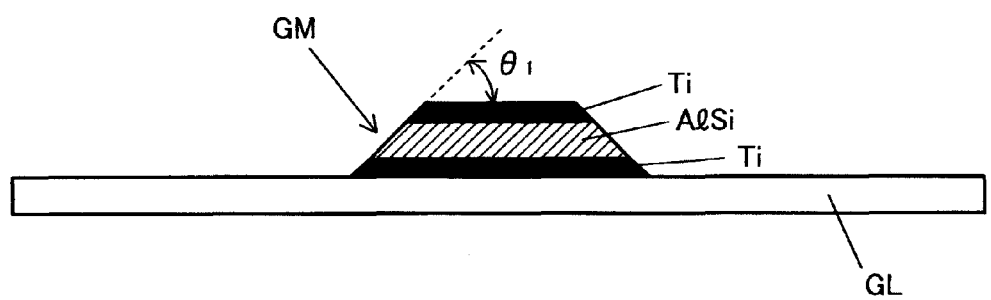
FIG. 2 is a diagram showing part of the manufacturing process for a liquid crystal display device according to the present invention (step of wet etching metal or gate wires)

Next, as shown in FIG. 2, a wet etching process is carried out on the metal layer for gate wires GM. As a result of this process, the metal layer for gate wires GM is etched so as to correspond to the wiring pattern of a photoresist film, not shown, and thus a gate wire (GM) is formed. When the concentration of hydrofluoric acid in the etchant is 0.6% or higher, it is possible to set the angle $\theta_1$ of the taper of the gate wire to 45° or less. Preferably the concentration is in a range from 0.7% to 1.3%, so that the angle $\theta_1$ can be set to approximately 20° to 30°.

Figure 3:
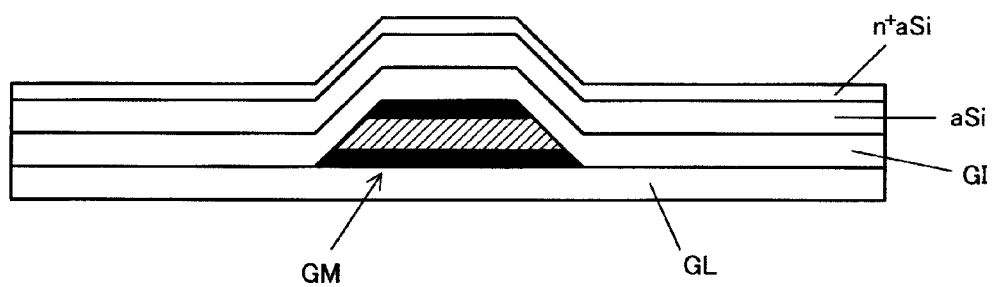
FIG. 3 is a diagram showing part of the manufacturing process for a liquid crystal display device according to the present invention (step of depositing a gate insulating film, aSi and n+aSi)
Figure 4:
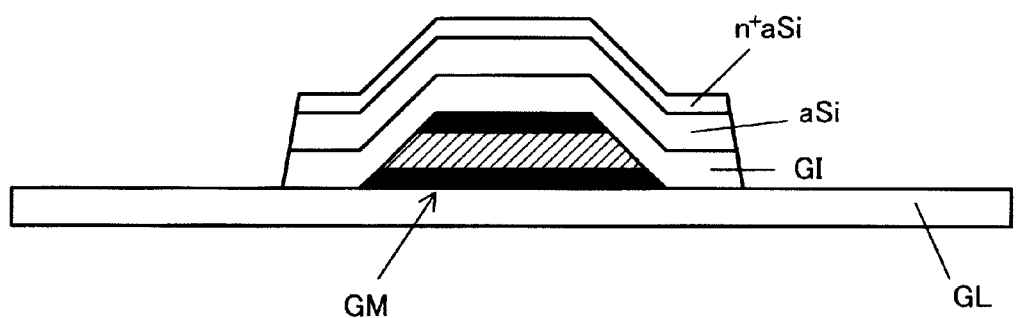
FIG. 4 is a diagram showing part of the manufacturing process for a liquid crystal display device according to the present invention (step of dry etching a gate insulating film, aSi and n+aSi)

Next, as shown in FIG. 3, a gate insulating film GI for covering the gate wire GM, an amorphous silicon film (aSi)

for forming thin film transistors and an n+ type amorphous silicon film (n+aSi) are deposited in sequence in accordance with a CVD method.

Next, the n+ type amorphous silicon film (n+aSi), the amorphous silicon film (aSi) and the gate insulating film GI are dry etched in a predetermined pattern, so that thin film transistors for driving pixels are formed.

Figure 5:
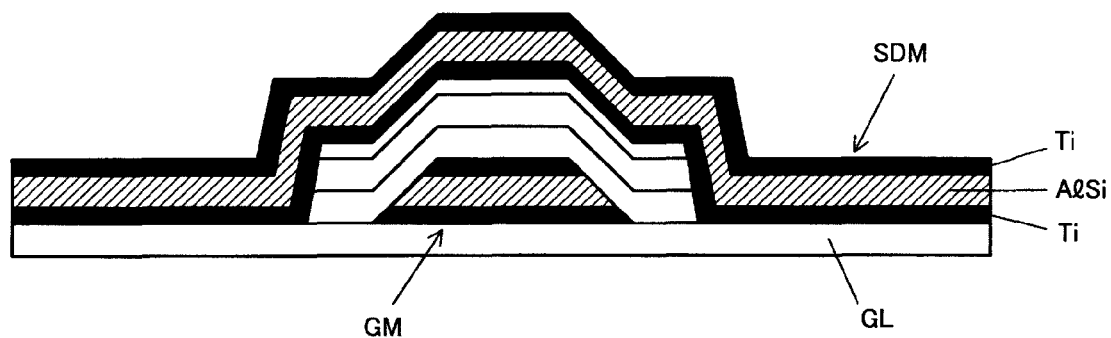
FIG. 5 is a diagram showing part of the manufacturing process for a liquid crystal display device according to the present invention (step of sputtering and vapor depositing a metal for source/drain wires)

Next, as shown in FIG. 5, the metal layer for source/drain wires SDM having a multilayer structure is formed from the same material as the metal layer for gate wires GM in FIG. 1. Concretely, titanium (Ti), an aluminum alloy (AlSi) and titanium (Ti) are layered in sequence in accordance with a sputtering and vapor depositing method as the metal layer for source/drain wires SDM.

Figure 6:
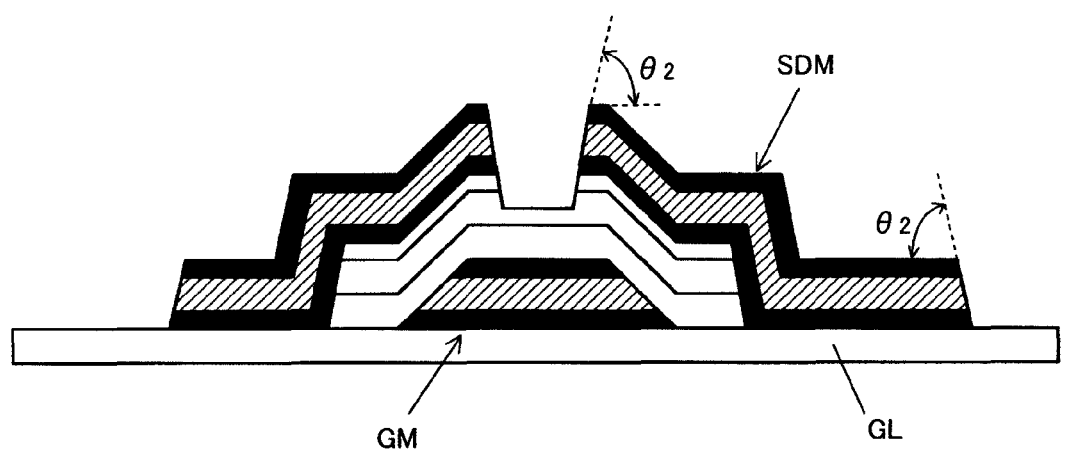
FIG. 6 is a diagram showing part of the manufacturing process for a liquid crystal display device according to the present invention (steps of wet etching the metal for source/drain wires and dry etching n+aSi)

Next, as shown in FIG. 6, the metal layer for source/drain wires SDM is etched in a pattern of source/drain wires through a wet etching process. In addition, the same photoresist film as used in the wet etching process is used to etch part of the n+aSi in a dry etching process. When the concentration of hydrofluoric acid in the etchant is 0.6% or less, it becomes possible to set the angle $\theta_2$ of the taper of the source/drain wires to 45° or more. Preferably, when the concentration is in a range from 0.1% to 0.5%, the angle $\theta_2$ can be set to approximately 60° to 70°. That is to say, the angle $\theta_1$ of the taper of the gate wires is smaller than the angle $\theta_2$ of the taper of the source/drain wires.

Figure 7:
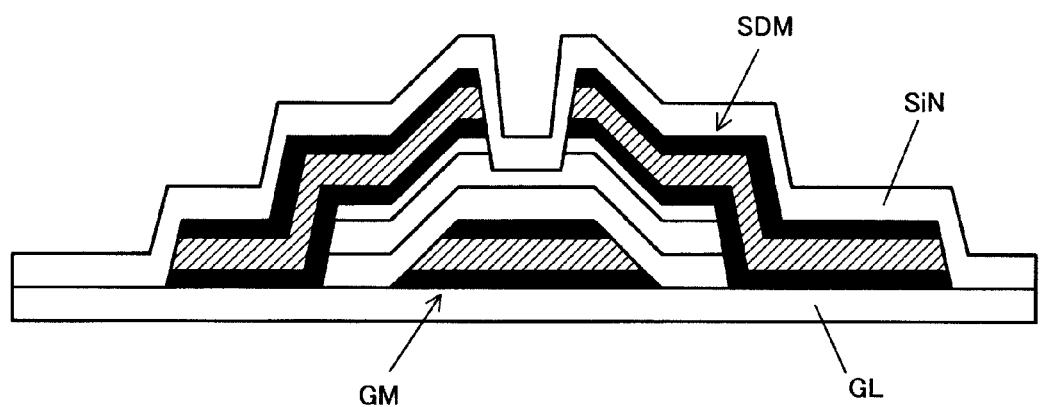
FIG. 7 is a diagram showing part of the manufacturing process for a liquid crystal display device according to the present invention (step of depositing SiN)
Figure 8:
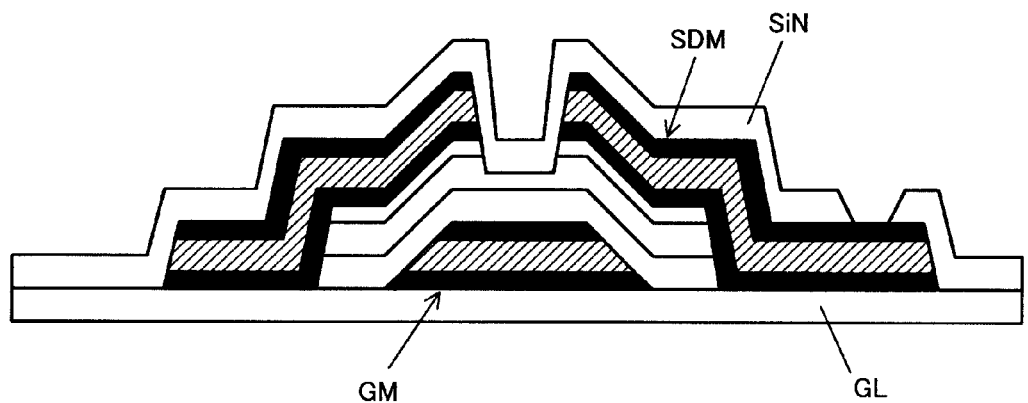
FIG. 8 is a diagram showing part of the manufacturing process for a liquid crystal display device according to the present invention (step of dry etching SiN)
Figure 9:
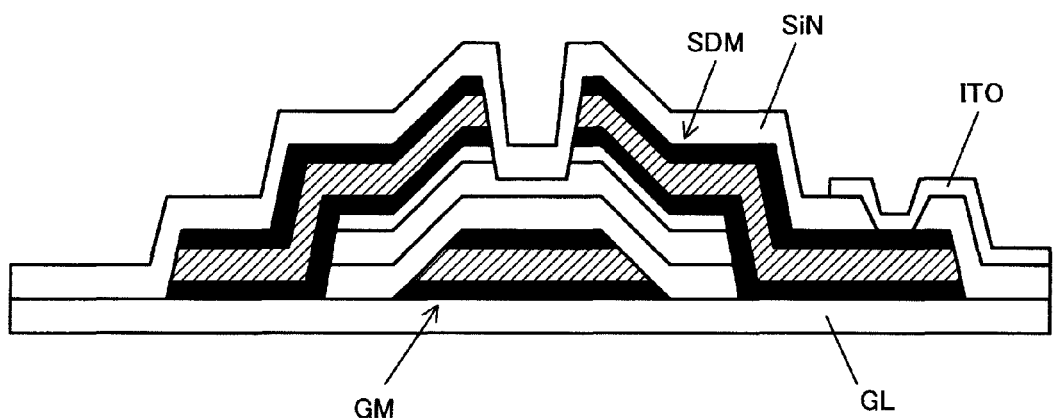
FIG. 9 is a diagram showing part of the manufacturing process for a liquid crystal display device according to the present invention (steps of sputtering and vapor depositing, as well as etching, ITO)

Next, as shown in FIG. 7, an insulating film SiN is deposited in accordance with a CVD method. Furthermore, as shown in FIG. 8, a dry etching process is carried out, so that the source/drain wires are exposed from part of the insulating film SiN, and a transparent electrode (ITO) is sputtered and vapor deposited so as to form a pixel electrode in the step in FIG. 9. Here, it is possible to pattern the transparent electrode to a predetermined form through etching if necessary after vapor deposition.

As described above, it is possible to form gate wires and source/drain wires together with thin film transistors used in a liquid crystal display panel in accordance with the process for a liquid crystal display device shown in FIGS. 1 to 9.

Thus, the present invention provides a liquid crystal display device having gate wires and source/drain wires with a multilayer structure made of the same material, which can be manufactured at low cost, as well as a manufacturing method for the same.

What is claimed is:

1. A manufacturing method for a liquid crystal display device having gate wires and source/drain wires, each with a multilayer structure and made of the same material, characterized in that
a wet etching process is carried out on the gate wires and the source/drain wires using an etchant including hydrofluoric acid and an oxidant where the concentration of hydrofluoric acid in the etchant is different for the etchant for the gate wires and the etchant for the source/drain wires, and further characterized in that
titanium, aluminum or an alloy thereof and titanium are layered in sequence in the multilayer structure.

2. The manufacturing method for a liquid crystal display device according to claim 1, characterized in that the concentration of hydrofluoric acid is lower in the etchant for processing the source/drain wires than in the etchant for processing the gate wires.

3. The manufacturing method for a liquid crystal display device according to claim 1, characterized in that the concentration of hydrofluoric acid for the etchant for processing the gate wires is in a range from 0.7% to 1.3% and the concentration of hydrofluoric acid for the etchant for processing the source/drain wires is in a range from 0.1% to 0.5%.

4. The manufacturing method for a liquid crystal display device according to claim 1, characterized in that an angle of a taper of the gate wires is smaller than an angle of a taper of the source/drain wires.

5. The manufacturing method according to claim 1, wherein the alloy of aluminum is AlSi or AlCu.

6. The manufacturing method according to claim 1, wherein the oxidant is selected from the group consisting of hydrogen peroxide, nitric acid and sulfuric acid.

7. The manufacturing method according to claim 1, wherein the etchant further includes water.

\* \* \* \* \*